United States Patent [19]

Reitter

[11] 4,173,278
[45] Nov. 6, 1979

[54] TRANSPORT MECHANISM FOR PARTS

[75] Inventor: Erwin Reitter, Cabot, Ark.

[73] Assignee: Remington Arms Company, Inc., Bridgeport, Conn.

[21] Appl. No.: 872,498

[22] Filed: Jan. 26, 1978

[51] Int. Cl.² .......................................... B65G 47/31
[52] U.S. Cl. ................... 198/461; 198/605; 198/627; 226/172
[58] Field of Search .............. 198/604, 605, 461, 626, 198/627, 628, 434; 226/172, 176, 177, 199, 111

[56] References Cited

U.S. PATENT DOCUMENTS

| 2,279,573 | 4/1942 | Lang | 198/604 X |
| 2,346,511 | 4/1944 | Schmitt | 198/461 |
| 2,695,125 | 11/1954 | Bowen | 198/626 X |
| 3,978,969 | 9/1976 | Williams et al. | 198/626 X |

FOREIGN PATENT DOCUMENTS

2538646  3/1977  Fed. Rep. of Germany ........... 198/626

*Primary Examiner*—Robert B. Reeves
*Assistant Examiner*—Douglas D. Watts
*Attorney, Agent, or Firm*—William L. Ericson; Nicholas Skovran

[57] ABSTRACT

A transport mechanism for feeding cylindrical or prismatic parts of discrete or indefinite lengths at a rapid rate and with accurate position control, through a work station for treatment by automatic inspection devices, part counters, roll printers, or other processing apparatus. A system of opposed belts and guides feeds the parts without rotation and without appreciable slippage at a uniform rate along a fixed feed axis, in such manner that the lateral relationship of the parts to the axis depends on their degree of conformity to a correct geometrical form. This facilitates the inspection of part form as well as dimensions, and improves the uniformity of other treatments. An arrangement of nip rolls driven at reduced speed separates discrete parts uniformly to ensure correctly-phased registration with inspection, rejection, counting, printing, or other treatment devices. The mechanism is readily adjustable to accept parts of different diameters or transverse dimensions.

13 Claims, 26 Drawing Figures

TRANSPORT MECHANISM FOR PARTS

BACKGROUND OF THE INVENTION

This invention relates to an improved transport mechanism for feeding parts or articles serially along an axis without rotation. It is especially adapted for use with appropriate electro-optical apparatus for automatically and continuously inspecting cyclindrical or prismatic articles or parts, for example: shotgun shell bodies; bearing rollers; tubing; glass, metal, plastic, or paper containers; and the like. The improved transport mechanism permits the rapid inspection of such parts to detect not only local flaws and irregularities in their surfaces, but also geometric deviations from correct surface form, and incorrect part dimensions. Other applications include part counters, roll printers for labeling separate parts or continuous articles, and color examiners, among others.

The rate of automatic electro-optical inspection of parts has heretofore been limited in part by the mechanical limitations of the transport means available to feed the parts through an inspection zone at a high speed, yet with a precise orientation and location relative to the inspection apparatus. It has been proposed to simply drop parts for free fall through the inspection zone, but this only permits sorting the parts according to overall color, since their orientation and location varies in a random fashion as they pass through the inspection zone. To inspect for discrete surface flaws, it is necessary to locate the articles in the inspection zone with greater precision.

One known method for achieving this, which is used in conjunction with a non-rotating inspecting light beam, is to halt the longitudinal movement along a feed axis of each part as it arrives at a fixed location in the inspection zone, and to mechanically rotate the part while oscillating the inspecting beam back and forth in a plane parallel to the major axis of the part. This serves to inspect the entire surface of the part with a series of wave-form scans of the light beam. Such a system must either fully halt and damp any longitudinal movement and rebound of each part prior to its rotation and inspection, which severely restricts the rate of inspection of the parts; or it may permit continuous longitudinal motion of the parts if a tracking system is provided to compensate for this motion, which is complex and relatively expensive. Furthermore, the method is, so far as I am aware, limited to the detection of local flaws and irregularities, and does not lend itself to inspection of the diameters of the parts or their trueness to correct overall geometric form. If, for example, a part is not truly cylindrical, but is slightly curved in the axial direction (commonly referred to as a "banana"), or has an oval cross-section, this will not influence the reflection of the longitudinally-scanning light beam in any reliably-detectable degree. It would be necessary to examine the specific profile of the part in a separate operation using other known inspection apparatus, to detect defects of this nature.

A variation of the foregoing known method entails automatically loading the parts on a rotary conveyor whose axis of rotation extends parallel to the major axes of the parts, and which conveys the parts serially to an inspection station. This requires either that the conveyor be indexed step-wise, and halted as each part is rotated on its arrival at the inspection station, which results in a relatively limited rate of inspection; or that a complex tracking system be provided to compensate for continuous conveyor motion.

Another known approach is to mechanically feed the parts in a vertical direction downwardly past a stationary light beam, and to rotate them simultaneously by means of feed rollers tangential to the feed passage and rotating on axes inclined with respect to its longitudinal axis. While this method avoids the necessity to stop the motion of the parts, the inspection rate is limited by a different factor. The stationary beam sweeps out a helical path over the surfaces of the parts, and the rate of rotation must be fast enough relative to the rate of vertical feed to give this helical path a small axial pitch, as otherwise the successive circumferential sweeps of the light beam will be speced too far apart to permit a thorough inspection of the parts. But the rate of rotation must in actual practice be kept moderate to avoid excessive perturbation of the parts laterally of the feed axis; and the feed rate is accordingly limited.

BRIEF DESCRIPTION

A general object of this invention is to expedite the accurate inspection or other processing of cylindrical or prismatic surfaces of a series of similar parts, or of articles of continuous length. It is also a general purpose to facilitate the inspection by appropriate apparatus of such parts or articles not only for local flaws, but also for proper geometrical form and dimensions. Another object is to provide an improved transport mechanism usable with suitable inspection devices or other processing apparatus to automatically and rapidly inspect or treat a series of similar substantially cylindrical or prismatic articles. Further objects and advantages will appear as the following description proceeds.

According to a preferred embodiment of the invention, a transport mechanism includes a plurality of feed elements defining a rectilinear feed axis. The feed elements, which may comprise belts trained on rollers, engage the peripheral surfaces of a series of cylindrical or prismatic parts at locations spaced apart along the feed axis at intervals less than the part lengths, so as to position correctly-shaped parts with their major longitudinal axes substantially coincident with the feed axis. Parts which deviate from a true cylindrical or prismatic overall form, for example those which are longitudinally curved or have an oval cross section, occupy positions surrounding the feed axis which are individually determined by their particular deformities.

An inspection zone or work station is defined between two successive locations of the feed elements, and preferably extends completely around the feed axis so as to permit direct incidence of a scanning inspection beam, or direct access for other processing, on the complete circumference of the parts. The feed elements engage the parts without slippage, and are drivingly connected with common actuating means which cause them to feed the parts through the inspection zone at a uniform linear velocity, and without rotation.

Local flaws in the surfaces of the parts, such as scratches, voids, waviness, and inhomegeneities, can be detected by sweeping an inspecting light beam around the circumference of the longitudinally-travelling parts, and measuring variations in the intensity of light reflected or scattered from their surfaces. At the same time, the improved transport causes the surfaces of those parts which have an incorrect geometrical form or an incorrect diameter, to be displaced laterally from the locus of the surface of a correctly-formed part, i.e. a circle or polygon centered on the feed axis and having the prescribed dimensions. This differentiation of locus as between geometrically-correct and defective parts facilitates a process of discriminating between them by sweeping an inspecting light beam transversely across their surfaces at regular intervals, and recording the lengths of the intervals at which contact is repetitively made and broken between the light beam and the profiles of the parts.

Inspection for local flaws and for correct shape and size can be combined into a single procedure by employing a method and apparatus which is the subject of a copending application filed by G. I. Buckson on Jan. 26, 1978, Ser. No. 872,499 for "Method and Apparatus for Optically Inspecting Cylindrical Articles," and I therefore prefer to employ those inventions in conjunction with a use of my transport mechanism in a part inspection system. Although the principles of that or other inspection apparatus form no part of the present invention, they will be discussed in functional terms at the conclusion of the specification, in order to provide a fuller comprehension of the utility and manner of use of the transport in such an inspection system.

The improved transport serves to longitudinally separate a series of parts with a uniform spacing along the feed axis. A set of opposed nip rolls at the entrance to the mechanism is driven at a slower uniform linear velocity than the main feed elements. In an inspection system, this facilitates the segregation of defective parts by a rejection mechanism positioned downstream from the exit of the mechanism; enables the lengths of the individual parts to be determined accurately; and allows time intervals between the passages of successive parts for automatic processing of data relating to each part. In other processing systems, it delivers parts at uniform intervals to a processing station in correct registry with other treatment apparatus, e.g. a roll printer for labelling the part surfaces.

The improved mechanism may be constructed for convenient adjustment to handle parts of different dimensions, by mounting opposed pairs of the feed elements in support casings which are jointly movable in opposite directions transverse to the feed axis. Drive means are provided with flexible connections in common with the opposed feed elements to maintain a uniform speed ratio in all adjusted positions of the feed elements.

GENERAL ARRANGEMENT

Figure 1:
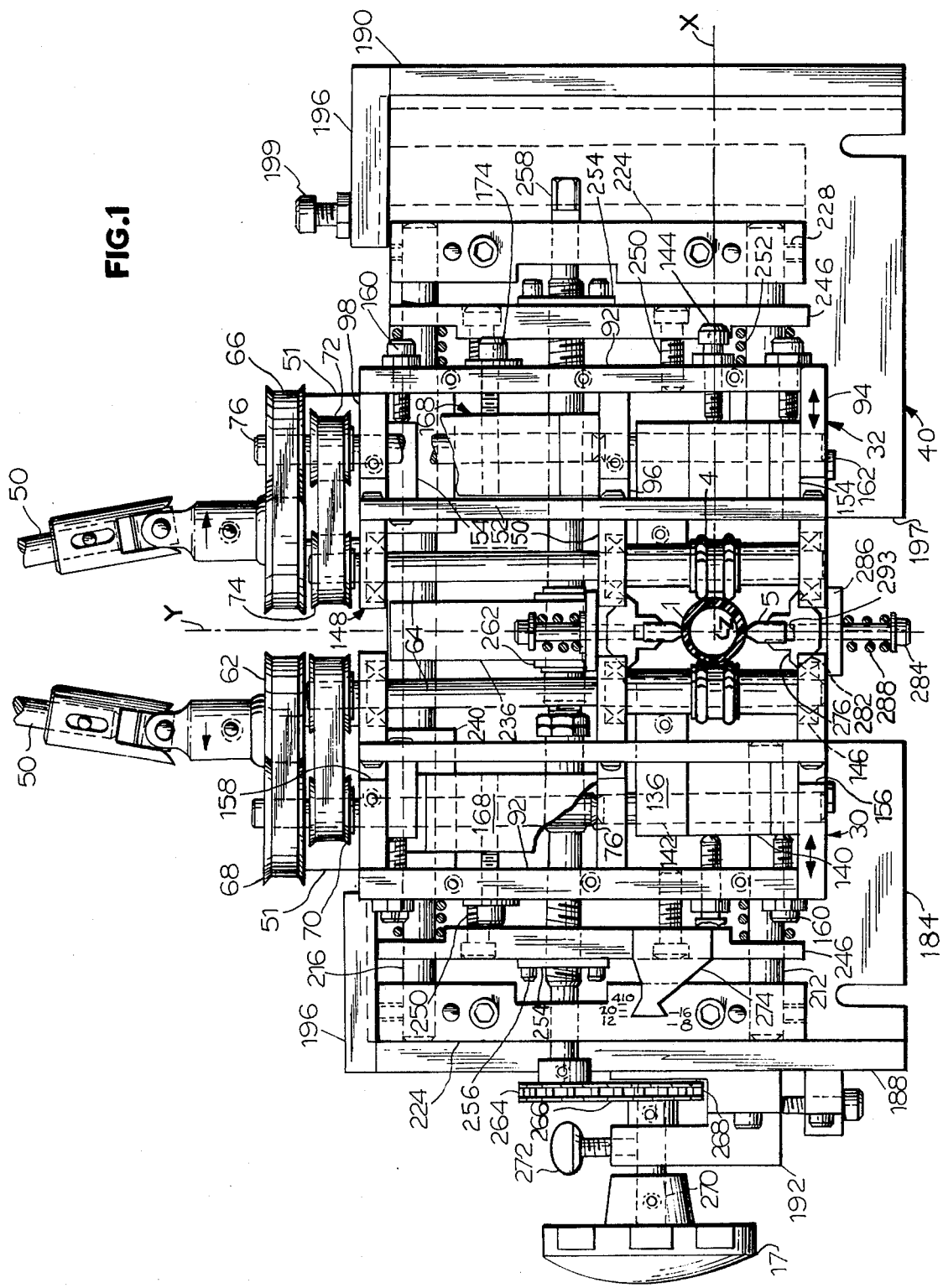
FIG. 1 is a plan view of a preferred embodiment of the transport mechanism, shown with a top cover removed for greater clarity.
Figure 2:
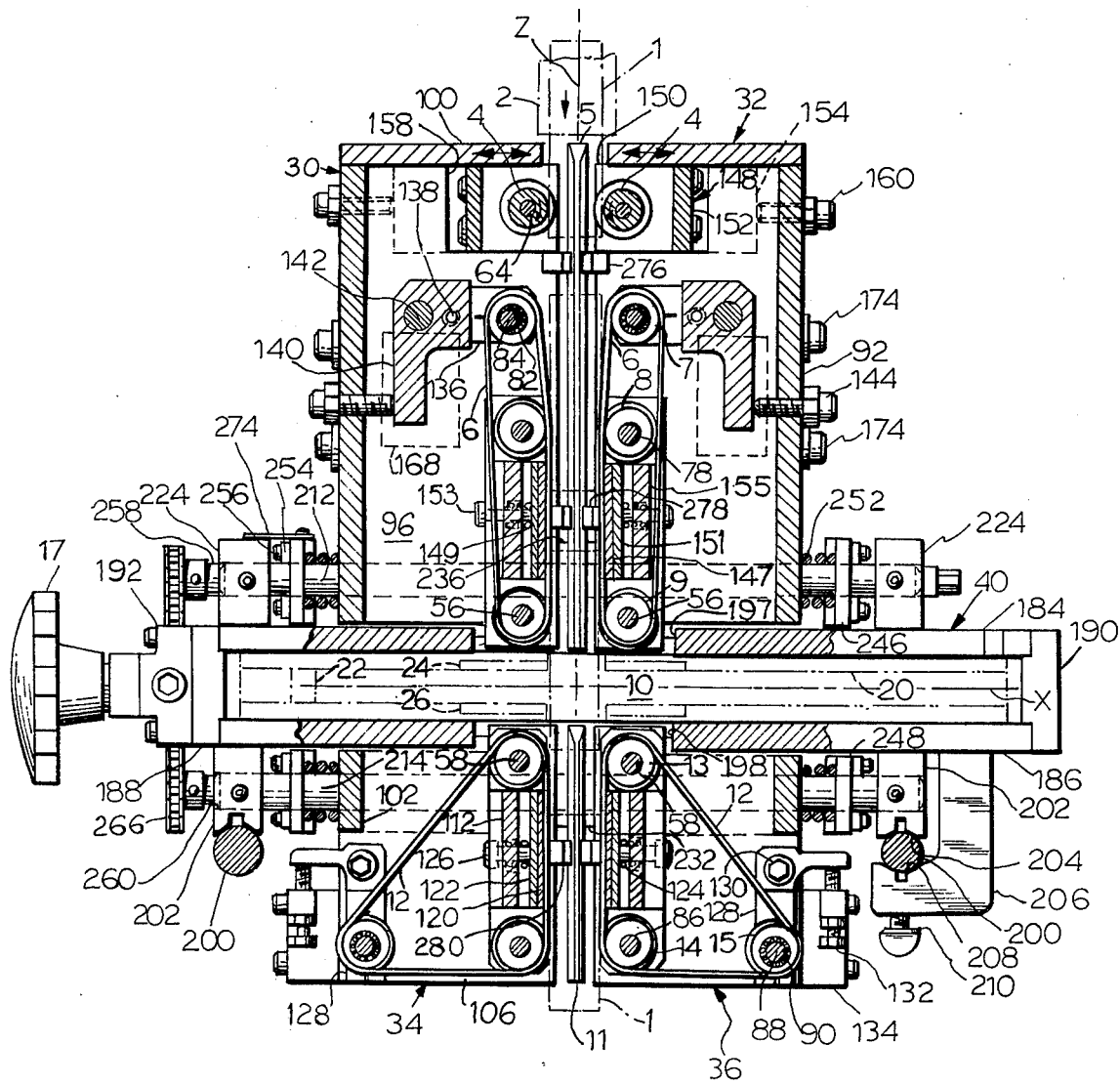
FIG. 2 is a fragmentary, partially-sectional view in front elevation.
Figure 3:
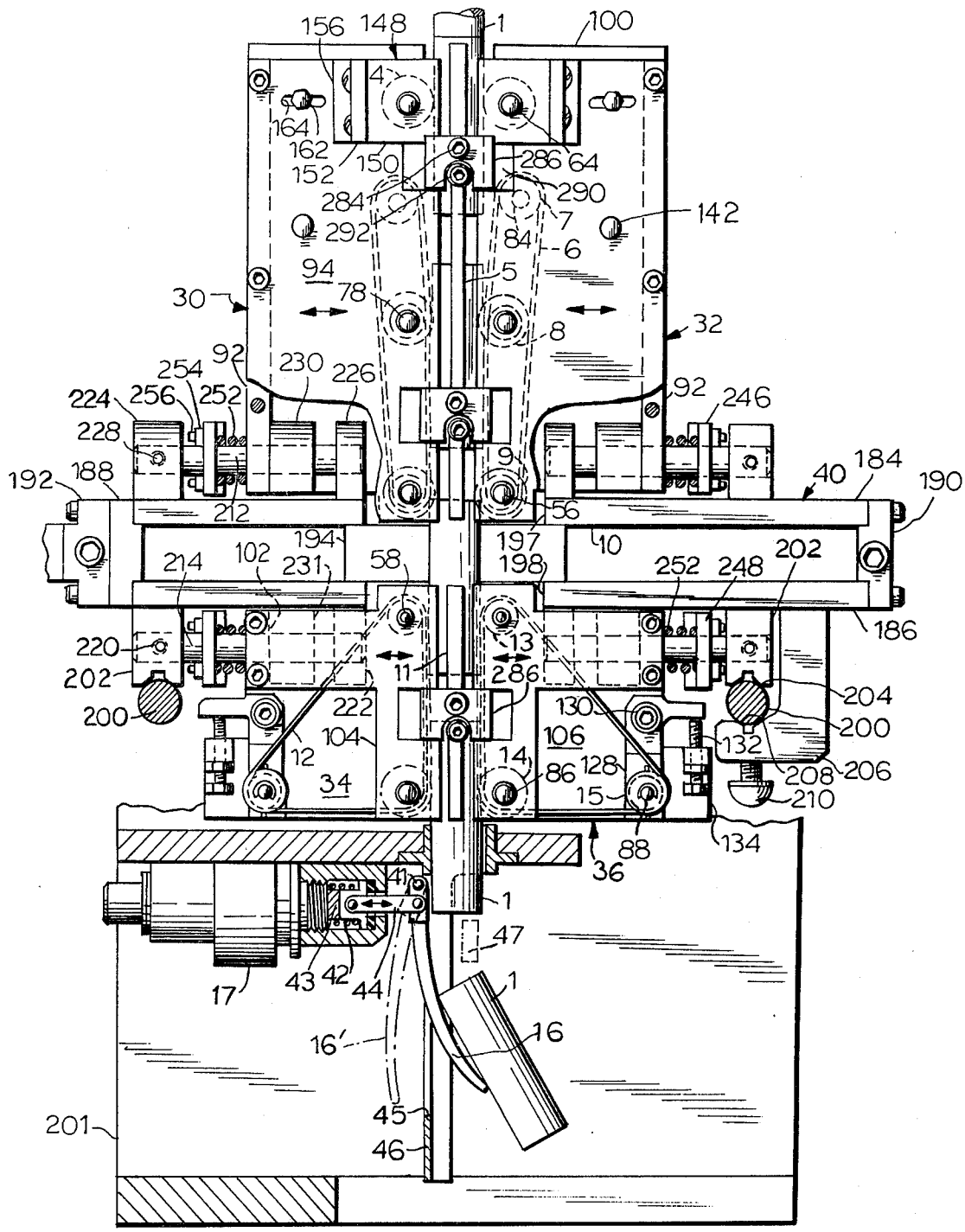
FIG. 3 is a fragmentary view in front elevation shown in conjunction with a device for rejecting defective parts.

Referring first to FIGS. 1-7, the improved transport mechanism receives a series of cylindrical parts 1, which may for example be tubular plastic hulls for subsequent assembly into shotshell casings, through a supply tube 2 shown in FIG. 2. The parts 1 may be fed into the mechanism by gravity from an end-to-end abutting stack. It is the general function of the mechanism to feed a series of these parts longitudinally, along a fixed vertical feed axis Z, through a work station or inspection zone 10 which is best shown in FIGS. 2 and 3, and is defined within an enclosure 40. To permit inspection of the parts at a high rate while restraining them against random lateral movements, they are neither rotated nor arrested during this translatory movement.

The mechanism is arranged to separate the parts longitudinally so that individual inspection signals can be derived for each part, and automatically processed in the intervals between the passages of successive parts. These individual signals may be employed both to record the numbers and types of defects, and to automatically actuate a rejection mechanism which separates defective parts from the stream. Separation also permits inspection of the lengths of the individual parts. In the preferred form, part separation is achieved by first gripping and feeding the parts 1 at a lower uniform velocity between a pair of diametrically opposed nip rolls 4, and then passing them to first and second pairs of parallel opposed feed belts 6 and 12 which are driven at a higher uniform velocity. As a result of this speed differential, the belts 6 feed the parts downwardly through the inspection zone 10 and to the belts 12 in a uniformly spaced-apart relation, as shown in FIGS. 2 and 3. Pairs of upper linear guides 5 and lower linear guides 11 slidably engage and locate the parts in a plane at right angles to the common plane of engagement of the parts by the rolls 4 and belts 6 and 12.

The vertical gap between the belts 6 and 12 is less than the length of the smallest parts to be inspected, so that the parts are positively positioned during their passage through the inspection zone 10 by spaced-apart locating means comprising the belts 6 and 12 and the guides 5 and 11. Thus those parts which have the correct cylindrical form are centered on the feed axis Z, while irregular parts are laterally positioned according to their individual deformities. The critical nature of precise lateral positioning of the parts will be enlarged upon later, under the topic of Applications, with special reference to FIGS. 8-20. Inspection is performed by suitable apparatus generally indicated at 20, 22, 24, 26 in FIG. 2.

The upper belts 6 are mounted on pairs of drive pulleys 9, idler pulleys 8, and tension-adjusting pulleys 7, while the lower belts 12 are trained around corresponding drive pulleys 13, idler pulleys 14, and tension-adjusting pulleys 15. To provide for adjustment of the spacing between opposed nip rolls 4 and belts 6 and 12, so as to accommodate parts of various diameters (such as different gauges of shotshell hulls), these elements are mounted in a pair of upper support casings 30 and 32 and lower support casings 34 and 36. These casings are adjustable by means of a knob 17 along the X axis (FIG. 1) in the directions shown by the arrows, the casings 30 and 34 moving in the opposite direction to the casings 32 and 36. At the same time, the guides 5 and 11 are automatically adjusted to an equal extent along the perpendicular Y axis (FIG. 1).

Separation of defective from good parts is effected as the parts drop from the lower belts 12, by means of a reject lever 16 shown in FIG. 3.

DETAILS OF THE MECHANISM

The reject lever 16 is pivoted at 41, and normally held in the rejecting position shown in full lines by a compression spring 42 acting through the solenoid plunger 43 and a pivotally-connected link 44. The reject lever extends through a slot 45 in a reject tube 46 to deflect a defective part to one side as shown. Good parts are allowed to fall directly downward into a receiver (not shown) by energizing the solenoid 17 to withdraw the lever to a retracted position 16', under the control of the inspecting devices 20-26. Upon detection of a defective part at the inspection station 10, the solenoid 17 is de-energized after an interval suitable for this part to pass down to the reject lever, releasing the latter at the proper time to deflect the bad part from the main stream. As an alternative to actuating the reject lever at a fixed time interval after a bad part is discovered, a photoelectric detector 47 may be placed at the level of the reject tube 46 to report the arrival of each part to suitable control apparatus (not shown) which also receives the signals from the inspecting devices 20-26. If, for example, the part 1 shown in the inspection station in FIG. 3 is reported defective, but the part preceding it was not, the control apparatus would be arranged or programmed to actuate the reject lever to the withdrawn position 16' as the preceding part passes through the reject tube, and then to release the lever to the full-line position 16 as the defective part subsequently arrives.

The driving arrangements for the mechanism allow for its adjustment to different part diameters. To this end, the opposed pairs of nip rolls 4 and belts 6 and 12 are driven (FIG. 4) through a pair of gears 49 fixed on universal-jointed drive shafts 50, which are rotatably supported by L-shaped bearing blocks 51 mounted on the support casings 30, 32. The shafts 50 are driven in common by a suitable motor and gearing (not shown) at equal speeds but in opposite angular directions, as shown by the arrows. The gears 49 in turn drive a first pair of pinions 52 and belt-drive shafts 56 associated with the upper support casings 30 and 32, and a second pair of pinions 54 and belt-drive shafts 58 associated with the lower support casings 34 and 36. The gears 49, 52, 54 may be replaced by timing belts.

The upper support casings 30 and 32 are mirror images of one another, and are each formed of a side plate 92, front, center, and rear support plates 94, 96, 98, and a top plate 100, these plates being mutually secured together. Each of the lower support casings 34 or 36 is secured to the rear support plate 98 of a corresponding upper casing 30 or 32 (see FIGS. 5 and 6), and consists of a side plate 102 secured to the corresponding rear plate 98, and mutually-secured front and center support plates 104 and 106.

The bearing blocks 51 for the drive shafts 50 are mounted on the rear support plates 98 of the corresponding casings 30, 32. The upper belt-drive shafts 56 are supported in bearings 108 in the plates 98, 96, and 94 (FIGS. 5 and 6), while the lower belt-drive shafts are supported by bearings 110 in the plates 98, 106, and 104. Thus the casings 30 and 34 form one integral unit movable along with their upper and lower belt-drive means, while the casings 32 and 36 form another unit separately movable together with their belt-drive means.

Each of the lower shafts 58 passes through a shoe support yoke 112, spacers 114, and a corresponding one of the drive pulleys 13, which are fixed on these shafts by set screws 116. The yokes 112 with spacers 118 are also received on the shafts 86 of the idler pulleys 14, which are mounted in bearings 119. As appears in FIGS. 2, 6, and 7, the belts 12 are resiliently supported, in their spans between the pulleys 13 and 14, by shoes 120 of polytetrafluoroethylene or the like; the shoes are mounted in holders 122, which are biased against the belts by springs 124 and movably mounted by screws 126 received through the yokes 112. In like fashion, a pair of similar shoes 147 mounted in holders 151 resiliently support the upper belts 6 under the bias of springs 149 located by screws 153 in yokes 155. These yokes are received on the shafts 56 and 78, along with suitable spacers 157 and 161, and the pulleys 8 and 9. The shafts 78 are mounted in the plates 96 and 94 by bearings 159. This arrangement of shoes 120 and 147 insures a uniform grip of the parts 1 by the belts 6 and 12.

Figure 6:
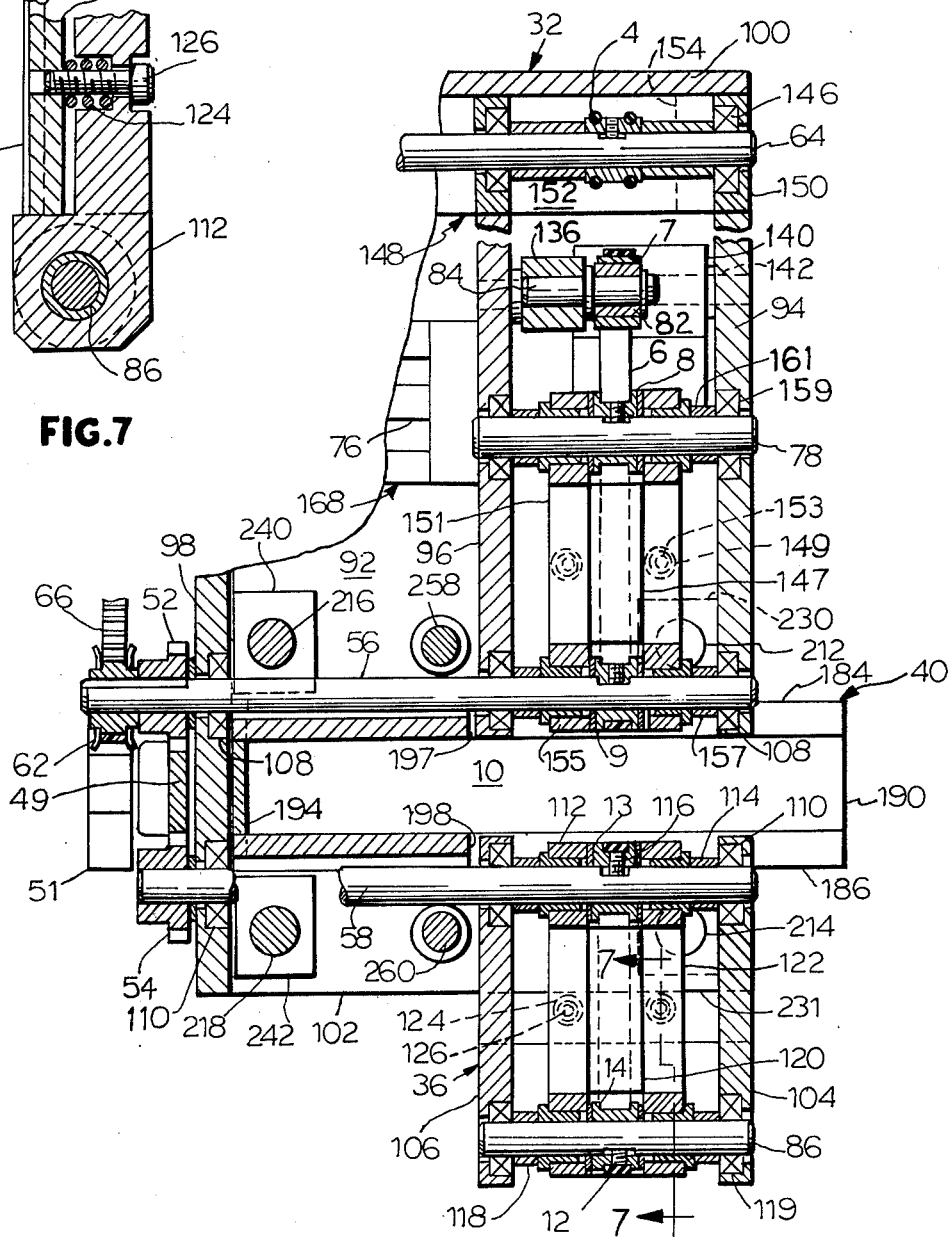
FIG. 6 is a fragmentary sectional view taken along line 6—6 in FIG. 4, looking in the direction of the arrows.

The tension of the lower feed belts 12 is adjustable by means best seen in FIGS. 2 and 3. These belts are extended around pulleys 15 mounted by bearings 90 on stationary tension-adjusting shafts 88. The shafts 88 are clamped in split L-shaped levers 128, which are pivotally mounted on the plates 106 by screws 130, and adjustably positioned by screws 132 mounted on the lower casings in brackets 134. In a similar manner, as best shown in FIGS. 2 and 6, the upper feed belts 6 extend around pulleys 7 mounted by bearings 82 on shafts 84, which are clamped in split arms 136 fixed by screws 138 to L-shaped levers 140. Both the arms 136 and levers 140 are pivotally mounted on rock shafts 142 supported in the plates 96 and 94. The tension of the belts 6 is adjusted by means of screws 144 threaded through the side plates 92 and bearing on the levers 140.

For driving the nip rolls 4 at a slower speed than the feed belts 6 and 12, a pair of timing belt pulleys 62 (FIGS. 1, 4, 5, and 6) are fixed on the shafts 56, and drive a pair of nip roll shafts 64 through timing belts 66, speed-reducing pulleys 68, 70 on shafts 76, timing belts 72, and pulleys 74. The speed ratio is selected to establish a desired uniform gap between the parts 1, which abut end-to-end as they enter the nip rolls, but are separated as they pass through the inspection station 10.

Adjustment of the spacing between the nip rolls 4, independent of the spacing between the feed belts 6 and 12, is provided for by mounting the shafts 64 and their bearings 146 in movable mounting frames 148. Each of these frames comprises three bearing blocks 150, a plate 152, and two locating blocks 154, all fixed together. The locating blocks are slidably received between the front and rear support plates 94 and 98, which are recessed at 156 and 158 to allow some displacement of the frames 148 parallel to the planes of FIGS. 1-4. Screws 160 are threaded through both of the side plates 92 to adjust the location of the frames 148 and nip rolls 4 with respect to the casings 30 and 32, so that the parts 1 can be precisely aligned on the feeding axis Z by the nip rolls. The frames 148 are further secured in their adjusted positions by screws 162 threaded in the frames and passing through elongated slots 164 in the front plate 94 (FIGS. 1 and 3).

Figure 5:
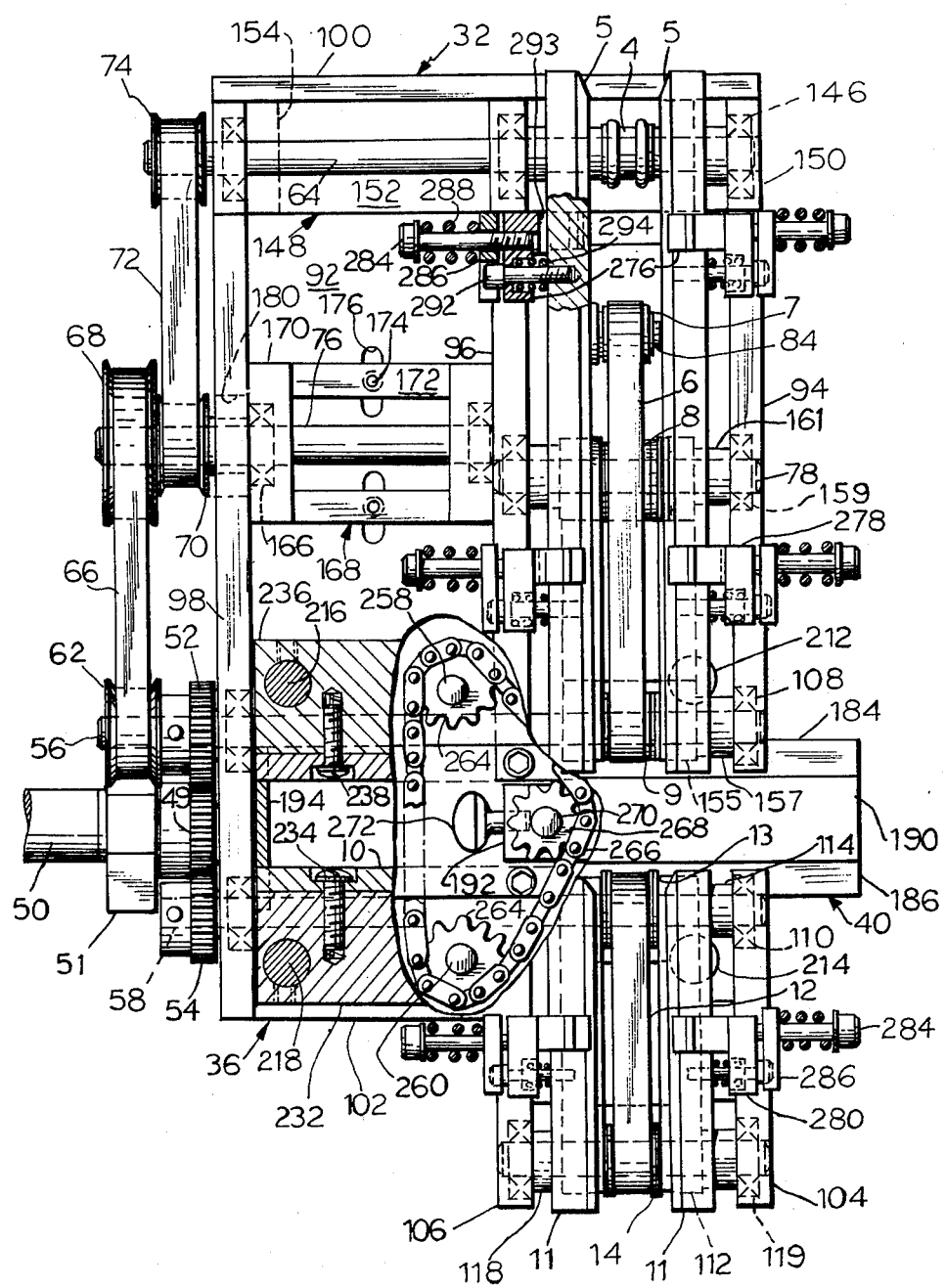
FIG. 5 is a fragmentary sectional view taken generally along line 5—5 in FIG. 4, looking in the direction of the arrows.

An adjustment of the nip-roll position with respect to the casings 30, 32 results in a corresponding movement of the pulleys 74 and the timing belts 72 which drive them. As best shown in FIGS. 1 and 5, the shaft 76 of each pair of speed-reducing pulleys 68, 70 is supported by bearings 166 in a movable adjusting cage 168 comprising bearing blocks 170 and spacer blocks 172 secured together. The cages 168 are received in vertically-slidable relation between the center and rear support plates 96 and 98, and are secured in suitably-adjusted relation to the pulleys 74 by screws 174 received through elongated slots 176 in the side plates 92, and by suitable set screws (not shown). Displacement of the shafts 76 is accommodated by elongated slots 180 in the rear support plates 98. Some change in the tension levels in the timing belts 66 and 72 results from an adjustment of the nip roll positions, but these changes are equalized by moving the cages 168 appropriately.

The stationary housing 40 is formed of upper and lower support plates 184 and 186 secured to side plates 188 and 190, a crank support bracket 192, a central spacer plate 194, and a pair of stop blocks 196. The plates 184 and 186 are recessed at 197 and 198, respectively, to accommodate the belts 6 and 12 and provide for passage of the parts 1 through the inspection enclosure 10 defined within the housing. The inspection apparatus 22, 24, 26 may conveniently be mounted in a slide 20 receivable in the enclosure 10 through the front surface of the apparatus (FIG. 2), and positioned by a stop screw 199 threaded through one of the stop blocks 196 (FIGS. 1 and 4).

The housing 40 is supported by means of a pair of lower rail supports 202 secured to the lower support plate 186 and having V-shaped grooves 204, on a pair of parallel support rods 200 (FIGS. 2-4) which are mounted on a base structure generally indicated at 201 in FIG. 3. For convenient servicing and adjustment, the mechanism is pivotally mounted on one of the rods 200 by means of a clamp 206 secured to the plate 186 and having a V-shaped groove 208 to engage the rod. The opposite rail support 202 merely rests on the corresponding rod 200, so that by releasing a clamping screw 210, the entire mechanism can be tilted to an inverted position.

Figure 4:
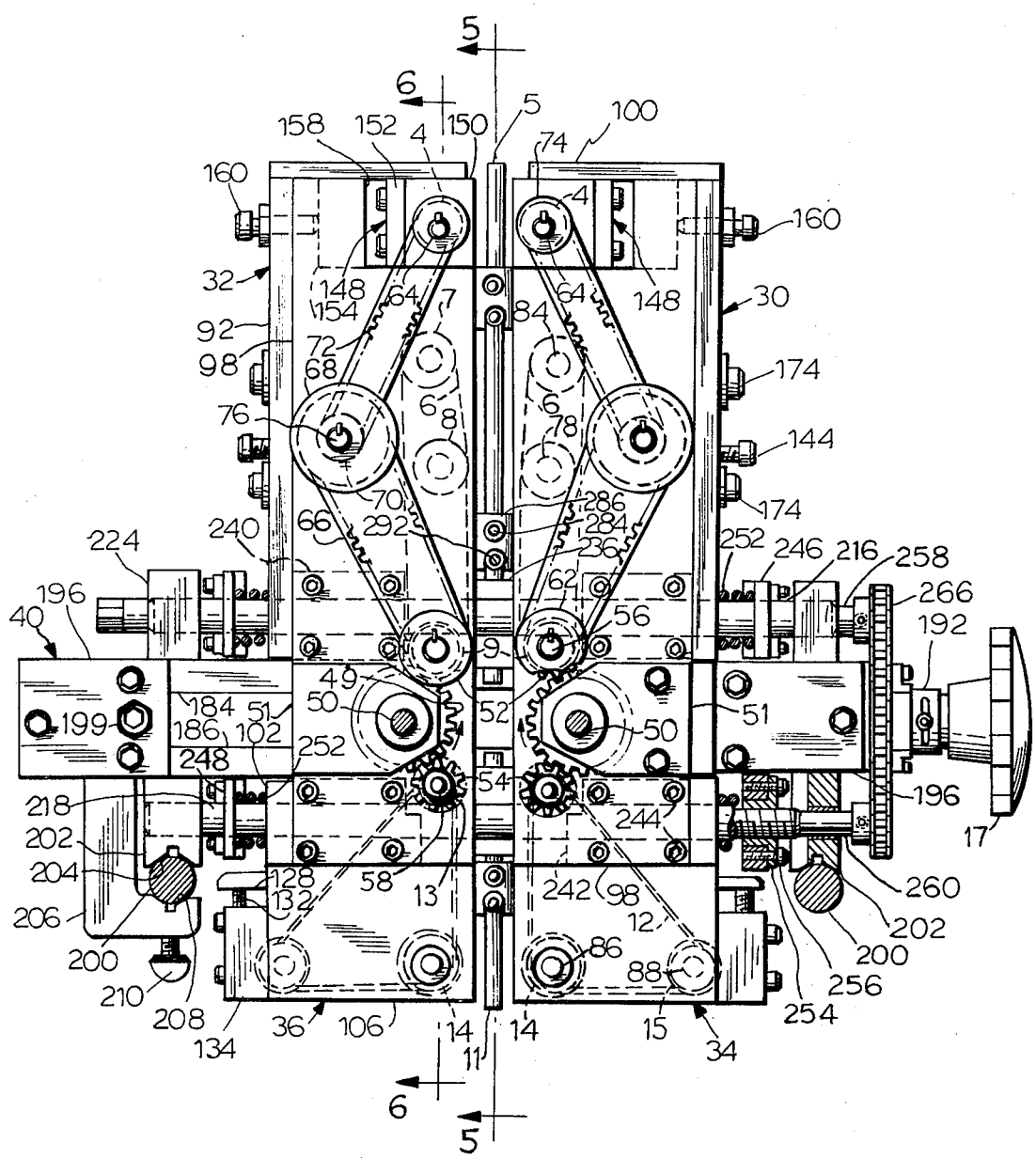
FIG. 4 is a view in rear elevation.

The casings 30, 32, 34 and 36 are slidably mounted on the housing 40 by means of pairs of upper rails 212 and lower rails 214 at the front of the mechanism (see FIGS. 1 and 3), and an elongated upper rail 216 and lower rail 218 at the rear (see FIGS. 1 and 4). The lower front rails 214 are mounted in the lower rail supports 202 and in blocks 222 secured to the plate 186, and are fixed by screws 220. Similarly, the upper front rails 212 are mounted in a pair of upper rail supports 224 and blocks 226 secured to the upper plate 184, and are fixed by screws 228. The casings 30-36 are slidably mounted on the rails 212 and 214 by means of bushings 230 and 231, respectively, which are preferably linear ball bushings, or are made of bronze or other low-friction material, and are secured to the end plates 92.

At the rear of the mechanism, the lower rail 218 is mounted in the rail supports 202 and a center support 232 (FIG. 5), which is fixed to the lower housing plate 186 by screws 234. Similarly, the upper rail 216 is mounted in the rail supports 224 and a center support 236, (FIG. 1 and 5) which is fixed to the upper housing plate 184 by screws 238. The casings 30-36 are slidably mounted on the rails 216 and 218 by means of bushings 240 and 242, respectively, which are preferably linear ball bushings, or are made of a low-friction material such as bronze, and are secured to the end plates 92.

A pair of upper adjusting-nut supports 246 (FIGS. 1-4) is slidably received on opposite ends of the upper rear rail 216, and also slidably received one on each of the upper front rails 212. A similar pair of lower adjusting-nut supports 248 is slidably received on opposite ends of the lower rear rail 218, and likewise received one on each of the lower front rails 214. I prefer to fix these adjusting-nut supports to the side plates 92 of the casings by means of screws 250 (FIG. 1), but provision can if desired be made for a yielding connection by removing these screws and relying on compression springs 252; this would permit the belts 6 and 12 and the casings 30-36 to move apart in a resilient manner so as to pass a deformed or oversized part 1 through the mechanism without jamming.

Each of the four supports 246 and 248 has an adjusting nut 254 mounted by means of screws 256, these nuts being of opposite threads at the left and right sides of the mechanism. A pair of adjusting shafts 258 and 260, whose ends have opposite threads, are threadedly received through the nuts 254, rotatably mounted in the rail supports 224 and 202, and located by bushings 262 (FIG. 1) in the center supports 232 and 236. Each of the adjusting shafts has a sprocket 264 (FIG. 5) fixed at one protruding end. A drive chain 266 is trained around these sprockets and a drive sprocket 268 mounted on a stub shaft 270, which carries the adjusting knob 17 and is rotatably mounted in the bracket 192. A screw 272 releasably secures the shaft 270 in any adjusted position.

Rotation of the knob 17 causes the shafts 258 and 260 to turn in a common angular direction, thus threading the adjusting nuts 254 and their supports 246 and 248 along these shafts, and correspondingly moving the left-hand casings 30 and 34 and the right-hand casings 32 and 36 with equal but opposite displacements along the X axis, i.e. in the directions shown by the arrows in FIG. 1. By this means, the spacing between the nip rolls 4 and the belts 6 and 12 can be adjusted to suit parts 1 of various diameters. An indicator 274 (FIG. 1) is mounted on one of the adjusting-nut supports 246 and cooperates with a scale marked on the adjacent rail support 224 to show the adjusted setting; the illustrated scale is intended for shotshell casings of various gauges.

The spacing between the linear guides 5 and 11 along the Y axis in FIG. 1, is automatically adjusted by the movements of the casings 30–36 to remain equal to the spacing between the opposed belts 6 and 12. As best shown in FIGS. 1, 2, and 5 this is achieved by mounting the upper guides 5 in pairs of brackets 276 and 278, and the lower guides 11 in pairs of brackets 280, and by chamfering the lateral edges of the guides and the mating edges of the plates 94, 96, 104 and 106 at complementary 45-degree angles, as indicated at 282 in FIG. 1. Thus a relative displacement of the casings 30–36 along the X axis produces an equal relative displacement of the guides 5 and 11 along the Y axis. Each of the brackets 276, 278 and 280 is supported by means of a corresponding screw 284, which passes freely through a locating block 286. Compression springs 288 received on the screws 284 resiliently clamp the brackets 276, 278 and 280 and the blocks 286 against opposite surfaces of the plates 94, 96, 104 and 106, and permit displacement of the brackets along the Y axis caused by movements of the casings 30–36 along the X axis. The blocks 286 are received in recesses 290 (FIG. 3) formed in the plates 94, 96, 104 and 106 to locate the brackets vertically. The guides 5 and 11 are resiliently mounted in mating recesses 293 in the brackets 276, 278, and 280, each by means of an interposed compression spring 294 and a screw 292 passing freely through the corresponding bracket, so that the guides may yield to pass any irregularly-shaped parts 1.

APPLICATIONS OF THE TRANSPORT MECHANISM

Various well-known inspection methods and apparatus may be used in conjunction with the mechanism of this invention for the purpose of inspecting the parts 1. I prefer, however, to employ a method and apparatus which is the subject of the aforementioned copending application of G. I. Buckson Ser. No. 872,499 since this affords a complete inspection of the parts not only for local flaws, but also for cylindricity, diameter, and length. While this subject matter forms no part of my invention, a general and functional description will now be given in order to afford a more comprehensive appreciation of one application of the improved transport mechanism.

Figure 8:
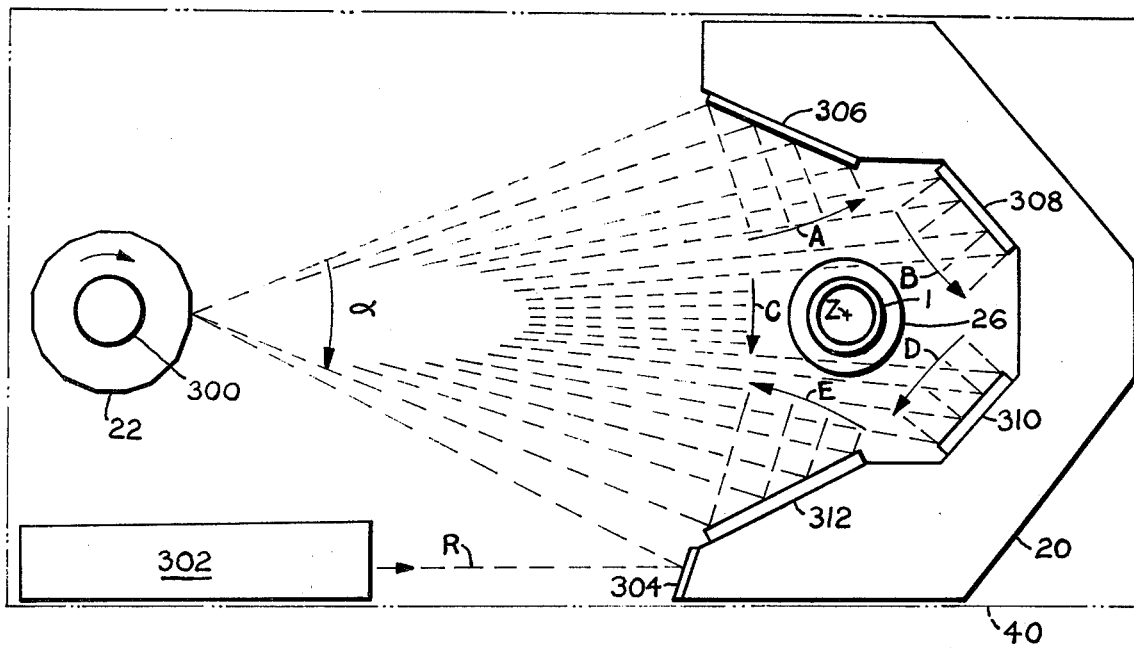
FIG. 8 is a schematic plan view of an electro-optical inspection apparatus which may be used with the improved transport mechanism.

FIG. 8 shows the inspection elements that are generally indicated at 20, 22, 24, and 26 in FIG. 2, in a schematic plan view. These elements include a container 20 which is slidably received in the inspection zone enclosure 40. A polygonal prism mirror 22 has a number of facets, e.g. 16, spaced equiangularly, and is mounted for rotation by a constant-speed motor (not shown) at a high speed, e.g. 6000 rpm, on a shaft 300. A source 302 of a collimated, and preferably coherent, light beam R is mounted in the container 20, and may comprise a helium-neon laser. The beam R is reflected by a stationary plane mirror 304 onto the rotating mirror 22, which causes the beam to sweep repetitively in a clockwise direction as shown by the curved arrow through an arc $a$ in the plane of FIG. 8, with a rapid frequency, e.g. 1600 sweeps per second. A number of plane mirrors 306, 308, 310 and 312 are mounted in the container 20. These are disposed at such angles that the sweeping beam consecutively passes across the mirrors 306 and 308, directly strikes the nearer surface of the parts 1 passing normal to the plane of FIG. 8 through the inspection zone, and then consecutively passes across the mirrors 310 and 312; and is thereby directed in a series of consecutive scans transversely across the parts 1, as suggested by the arrows A, B, C, D, and E. Each of these five scans covers considerably more than one-fifth of the circumference of the parts, so that a thorough coverage of the part surfaces is insured. Each scan also passes through a substantially equal arc which is greater than necessary to cover the diameter of the parts, so that uniform periods of contact between the beam and the parts are interspersed with uniform periods of disjunction.

Figure 9:
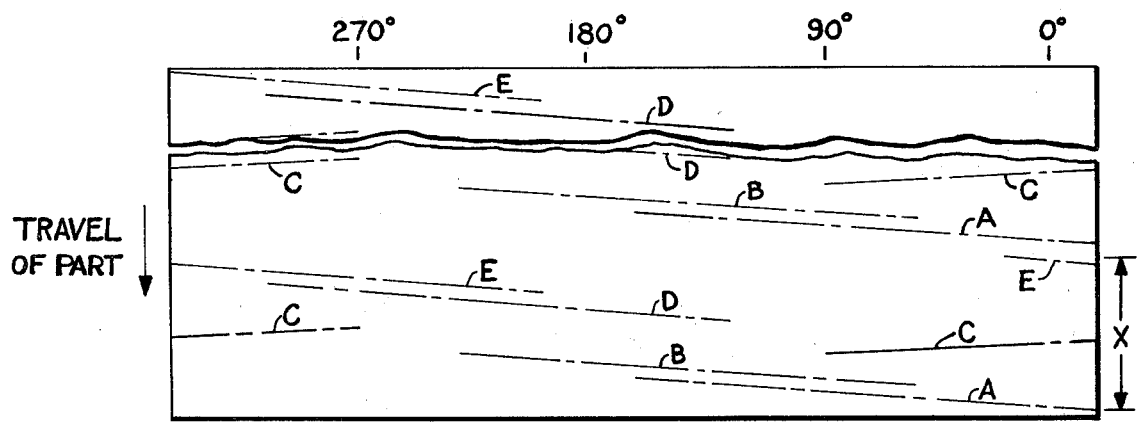
FIG. 9 is a developed view of the surface of a part, illustrating a pattern traced by an inspecting light beam.

The parts 1, passing in translation through the inspection zone normal to the plane of FIG. 8, have a motion relative to the transversely-sweeping light beam which produces staggered helical scans of the incident beam around the surfaces of the parts. This is shown in FIG. 9 on an enlarged developed view of a portion of a part surface. Only the centerline of the beam's incidence is shown, since it preferably has a width somewhat greater than the spacing between successive sweeps, in order to thoroughly cover the entire surface. Assuming that it is desired to inspect 10 parts per second, each 3 inches long, with a 1 inch gap between parts, the required translatory velocity of the parts would be 40 inches per second. At a sweep frequency of 1600 per second, the total part length covered by each sweep of five scans A–E would amount to only 0.025 inch. This length is shown on a greatly-enlarged scale at X in FIG. 9. Within each sweep, the five individual scans A, B, C, D, and E overlap arcuately, each covering substantially more than one-fifth of the circumference. Scans A, B, D, and E have centerlines in the form of counter-clockwise helices, while scan C is clockwise. There is a slight step while the part continues to travel between successive scans. With, for example, a typical effective beam diameter of 0.05 inch and a total sweep length X of 0.025 inch, it will be seen that the successive scans overlap considerably, so that every portion of the part surface is inspected more than once. It will also be observed that the lengths of the individual parts can be determined by electronically counting and recording the total number of scans of the light beam made on each part.

A portion of the light beam striking the parts 1 is specularly reflected, but this portion is not utilized. Instead, the intensity of light that is diffusely scattered from the parts is detected by a pair of annular silicon diode detectors 24 and 26. The active major surfaces of these detectors confront one another across the inspection zone, are located in planes parallel to the plane of the scanning beam R in FIG. 8, and are equally spaced above and below that plane. The parts pass through central openings in the detectors along the feed axis Z, which is normal to the planes of the detectors and the scanning beam.

Figure 11:
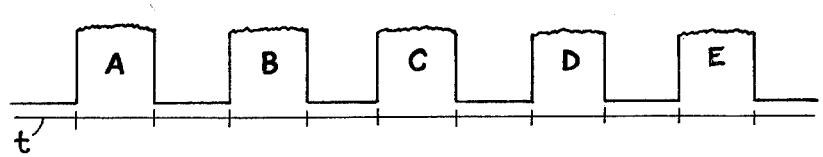
FIG. 11 is a representation of inspection signals derived by the apparatus of FIG. 8 from the normal part of FIG. 10.

The light scattered onto the surfaces of the detectors is utilized to generate electronic signals which are processed by suitable circuitry (not shown) to produce inspection signals. These signals are represented in FIG. 11 as a waveform having a series of pedestals resulting from the correspondingly-lettered consecutive scans included in one circumferential sweep of the beam R around a part. These are separated by uniform intervals of a reduced arbitrary or zero voltage during which the light beam is out of contact with the part. A series of these waveforms is produced for each part, equal in number to the total of circumferential sweeps carried out during the transit of that part through the inspection zone.

Figure 10:
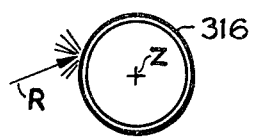
FIG. 10 is a plan view of a normal part located concentrically with an inspection axis Z.

The waveform shown in FIG. 11 is produced by a normal part 316 shown in FIG. 10, whose cross-section has the correct form and diameter, and from which the beam R is scattered in a normal fashion. FIGS. 12–19 show parts having various defects, and the waveforms that these defects produce. For purposes of comparison, the same time scale t is shown beneath each waveform.

Figure 12:
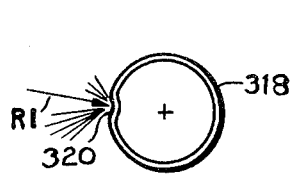
FIG. 12 is a plan view of a flawed part generally illustrating the manner of light scattering by a local flaw in the part surface.
Figure 13:
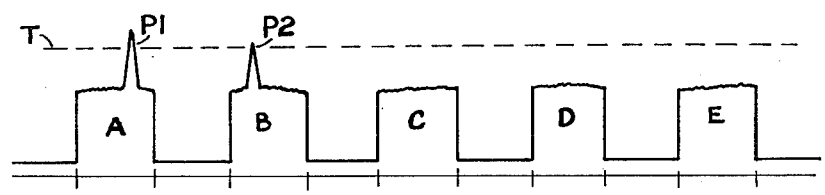
FIG. 13 is a representation of inspection signals derived from the flawed part of FIG. 12.

A part 318 which has a local flaw 320 in its surface, such as a gouge, scratch, or wave, or an inhomogeneity in the material, is shown in FIG. 12. When the beam strikes this flaw, as suggested at R1, it is scattered in an abnormal manner. As appears in the resulting waveform of FIG. 13, this produces voltage peaks such as P1, P2 in each of the scans A–E that includes the flawed area of the part. Peaks rising above a predetermined voltage threshold level T operate to generate a rejection signal, which is in turn applied to actuate the reject lever 16 of FIG. 3 at the proper time to remove the flawed part from the main stream.

Figure 14:
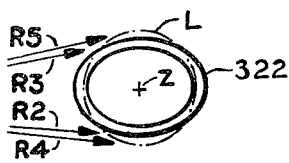
FIG. 14 is a plan view illustrating the scanning of an abnormal part having an oval cross-section.
Figure 15:
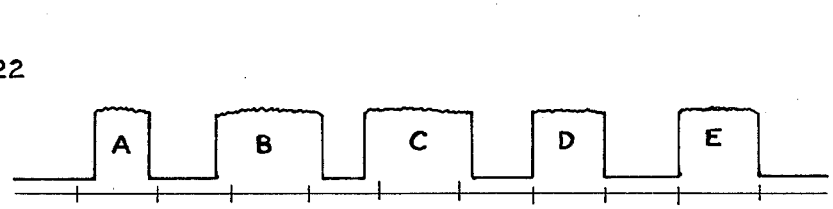
FIG. 15 is a representation of inspection signals derived from the oval part of FIG. 14.

The system is also capable of detecting overall geometrical deformities of the parts, such for example as in a part 322 shown in FIG. 14, which is not correctly cylindrical, but has an oval cross-section. This becomes apparent on comparison with a circular locus L of the prescribed part diameter, and centered on the feed axis Z. The part is shown receiving rays R2–R5 projected from the mirror 306 during one of the scans labelled as A in FIG. 8. The rays R2 and R3 indicate the locations of the light beam at the points where it first contacts the oval part, and where it breaks contact, respectively. The rays R4 and R5 represent the corresponding beam locations that would apply to a normal part that coincided with the correct locus L. It will be seen that in consequence of the displacement of the rays R2 and R3, the pedestal A produced in the waveform by this scan will be of shorter duration than normal, as shown in FIG. 15. For the other scans, the pedestals have varying durations, depending on the directions from which the individual scans are directed. An oval form can therefore be identified by a varying pedestal duration.

Figure 16:
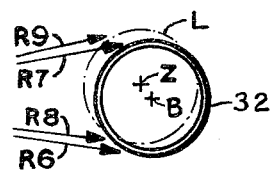
FIG. 16 is a plan view illustrating the scanning of an abnormal part which is not truly cylindrical, but is curved along its longitudinal axis like a banana.
Figure 17:
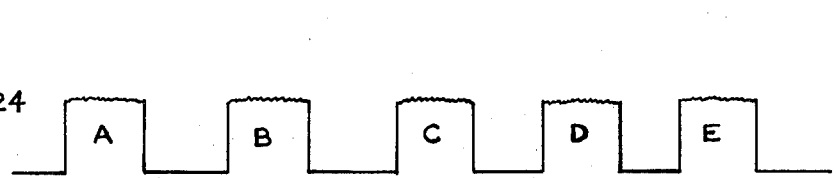
FIG. 17 is a representation of inspection signals derived from the banana-like part of FIG. 16.

Another type of non-cylindrical deformity is exemplified by a part 324 in FIG. 16, which has a circular cross-section, but is longitudinally bowed into a form commonly described as a banana. Some portions of the part therefore pass through the inspection beam R eccentric to the feed axis Z and the locus L. The center of one such portion is indicated at B. Here, the rays R6 and R7 of scan A which first and last contact the part, both occur earlier in the scan than the corresponding ray locations R8 and R9 for a correctly-formed part. The corresponding pedestal A occurs earlier in the waveform than normal, as shown in FIG. 17. Some of the other pedestals B–E may occur either later or earlier than normal, depending again on the scanning direction. However, they are of normal duration because the diameter of the part is correct; and a banana form can be recognized by a combination of this with a varying interval between successive pedestals.

Figure 18:
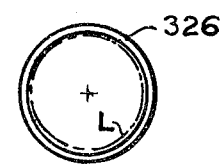
FIG. 18 is a plan view of an oversized part.
Figure 19:
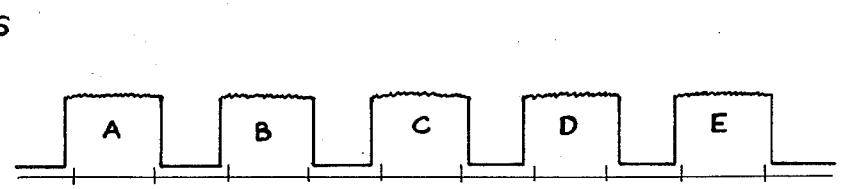
FIG. 19 is a representation of inspection signals derived from the oversized part of FIG. 18.

In the case of a part 326 shown in FIG. 18, which has an oversized diameter but is otherwise properly formed, it will be apparent that a waveform with pedestals of consistently longer duration than normal will appear, as shown in FIG. 19; and an undersized diameter would produce pedestals of consistently shorter duration (not shown).

The minimum variations in diameter or overall geometric form that can be detected without ambiguity are limited by random transverse movements of the parts passing through the inspection zone, because the relative timing and duration of the signal pulses is affected by any random lateral motion as well as by actual deviations in overall size or shape from the norm. Parts such as shotshell casings which are of a flexible and yielding character tend to fluctuate laterally in the inspection zone when fed at high speeds. The tolerance limits within which such parts can be satisfactorily inspected as to diameter and overall shape, are restricted to values greater than the excursions of the parts caused by these lateral fluctuations.

For purposes of controlling the processes of manufacture of the parts, it is desirable not merely to identify and reject defective parts, but also to record the occurrences of each particular type. The various waveforms derived from the inspection can be processed to identify and record the number of occurrences of various types of deformities, as well as to actuate the reject lever 16 (FIG. 3) previously described for separating any malformed parts.

Figure 20:
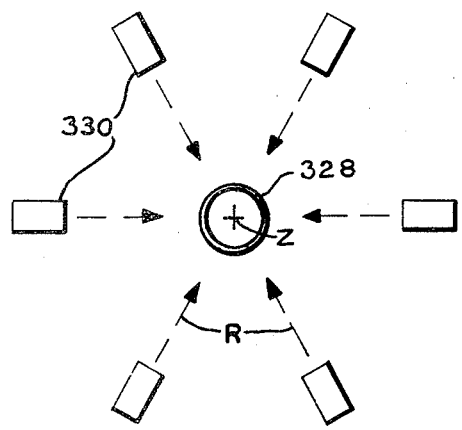
FIG. 20 is a schematic plan view of a different form of electro-optical inspection apparatus which may be used with the improved transport mechanism.

Another type of inspection device usable with my transport mechanism is schematically shown in FIG. 20. Here, a number of housings 330 containing lasers or other sources of stationary non-scanning collimated light beams R are mounted in circumferentially-spaced relation around the inspection zone, so that the beams impinge simultaneously from various directions on arcuate sectors of a part 328 passing along the feed axis Z, normal to the plane of the drawing. The housings 330 may also contain suitable photodetectors (not shown) for detecting directly-reflected light, or detectors of scattered light may be used, such as the annular silicon diodes 24 and 26 previously described. Such a system is capable of counting the parts passing through the detection zone, and of determining changes in surface reflectivity to identify local flaws, but is not suited to detecting variations in overall geometric form.

As had been pointed out, various treatments and processes other than an inspection of the parts may be carried out as the parts pass through the work station or inspection zone defined within the container 20 and enclosure 40, by substituting suitable apparatus in place of the inspection devices 22–26. Examples include roll printers for marking the surfaces of the parts, and part counters. The capability of the transport mechanism to feed parts through the enclosure 40 with uniform spacing and velocity, and in accurate alignment with the feed axis, contributes to the uniformity of results of such other treatments just as it does to the reliability of an inspection process. The arrangements of the feeding elements effectively resist random tendencies of the parts to become tilted or laterally displaced with respect to the feed axis. Uniformity of the rate of travel of the parts and the spacing between them is promoted by the non-slip characteristics of the feed elements as well as by their interconnected driving arrangements.

The transport mechanism is adaptable to feeding parts of prismatic rather than cylindrical form. Prismatic parts whose cross-sections are generated by even-sided polygons such as squares or octagons can be fed without substantial modifications, while a rectangular or hexagonal section would require only a change in the relative spacings between the belts 6 and 12 and the guides 5 and 11 appropriate to its relative dimensions. A part with a section generated by an odd-sided polygon could be handled by an arrangement of belts and guides of suitable numbers, set at appropriate angles.

MODIFICATIONS OF THE TRANSPORT MECHANISM

Figure 21:
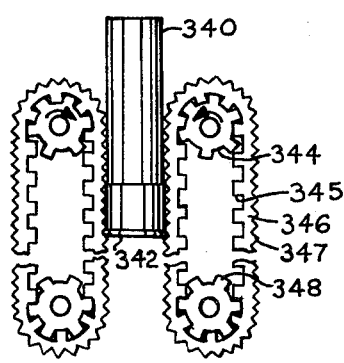
FIG. 21 is a schematic view showing a means for feeding a headed part through the transport mechanism.

It is also feasible to feed parts which are not entirely uniform cylinders or prisms, but which have heads or other projections. This requires a suitable modification of the feed belts 6 and 12 to pass such projections without interference. An example of such a modification is shown in FIG. 21, for feeding cylindrical shotshell casings 340 to which heads or caps 342 having enlarged rims are attached.

Each pair of feed belts 6 or 12 of the embodiment of FIGS. 1-7 is replaced by a pair of elastomeric timing belts 346 which have serrations 347 around their outer surfaces. These serrations are separated by recesses deep enough to receive the rims of the shotshell casings, while allowing the crests to engage the cylindrical parts of the casings without slipping. The inner surfaces of the belts are preferably formed with teeth 345, and these are driven by pairs of toothed sprockets 344 and 348. Since the phase relationship between the sprockets is maintained by their common driving connection, the recesses between the serrations 347 may be maintained in uniformly-opposed relation to properly receive the caps 342.

Figure 7:
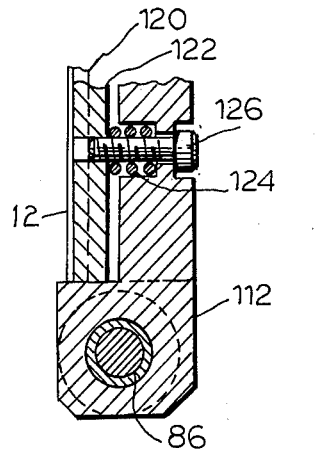
FIG. 7 is a fragmentary sectional view taken along line 7—7 in FIG. 6, looking in the direction of the arrows, and showing details of a feed belt support shoe arrangement.

In the construction of the transport that was previously described, the feed belts 6 and 12 are resiliently supported, as shown in FIGS. 2, 6, and 7, by shoes 120 and 147 and compression springs 124 and 149. Some parts, such as shotshell hulls molded with integral basewads, are not uniformly compressible; these may not be gripped uniformly enough by spring-loaded shoes to feed them at a completely uniform velocity. Also, parts that are shorter than the spacing between the pairs of belt pulleys 8 and 13 are laterally positioned only by the pulleys 9 and the shoes 120 during a portion of their movement through the work station 10; and a highly resilient shoe support may allow portions of some types of parts to oscillate laterally as they pass through the work station, and thereby produce false inspection signals or otherwise interfere with proper processing.

Figure 22:
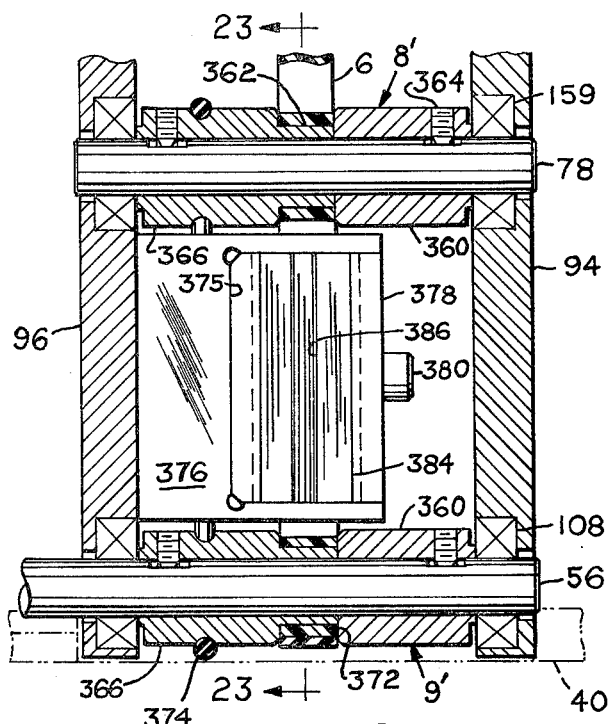
FIG. 22 is a fragmentary sectional view of a modified feed belt roller and resilient support shoe arrangement.
Figure 23:
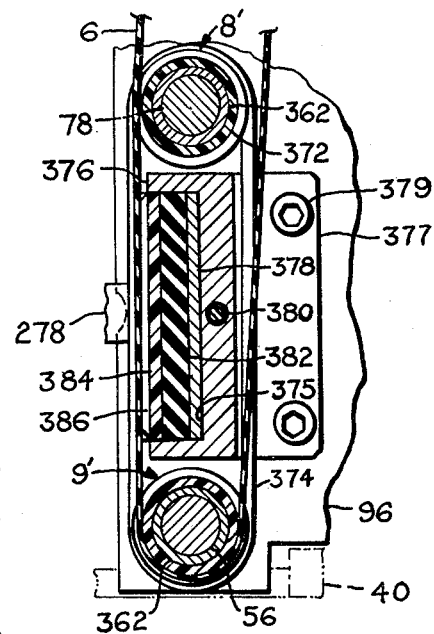
FIG. 23 is a fragmentary sectional view taken along line 23—23 in FIG. 22, looking in the direction of the arrows.

To overcome these difficulties when handling such parts, a modified belt support arrangement shown in FIGS. 22 and 23 provides a relatively firm support for a belt shoe 384 of nylon or other low-friction material. Parts similar to those of FIGS. 1-7 are similarly numbered in FIGS. 22 and 23. The shoe 384, which has a T-shaped cross section and is longitudinally grooved at 386 to reduce friction, is backed by a pad 382 of hard rubber or other elastomeric material, and mounted in a T-slotted holder 378. This holder is in turn received conformably, and secured by a screw 380, in a recess 375 of a mounting bracket 376, which has a flange 377 secured to the center support plate 96 by screws 379. A pair of such shoe arrangements for each pair of belts 6 and 12 gives a precisely-located and relatively firm support.

FIGS. 22 and 23 also show modified pulleys 8' and 9', each of which consists of separable sections 360 and 366 secured on the corresponding shaft 56 or 78 by set screws 364, and providing a central portion 362 of reduced diameter in which the belt 6 rides. The remaining pulleys 7, 13, 14 and 15 are not illustrated in these figures, but may be similarly modified. Collars 372 of a high-friction plastic material are received about the central portions 362 to reduce belt slippage and consequent abrasion. These collars also help to absorb compressive loads imposed by parts which are not uniformly compressible, such as shotshell bodies that have integral basewad portions.

Since the idler pulley 8' is engaged by the belt 6 about a relatively small arc, it may tend to slip when no part is present to insure firm contact. To reduce belt wear caused by this slippage, it is preferred to drive the pulley in a positive manner through a continuous elastomeric loop 374 stretched around the pulleys 8' and 9', rather than merely by engagement with the belt. Belt wear is also reduced by the mounting of the shoes 384 on the plate 96 as previously described, since this eliminates the frictional restraint imposed on the pulley shafts by the yokes 112 and 155 of the embodiment of FIGS. 1-7.

Figure 24:
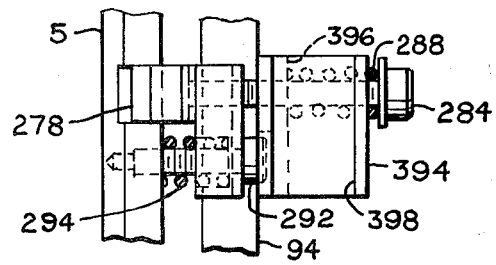
FIG. 24 is a fragmentary view in side elevation of a modified linear guide mounting device.
Figure 25:
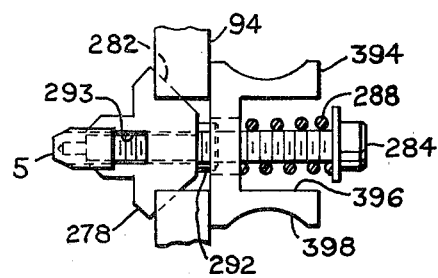
FIG. 25 is a fragmentary plan view of the mounting device of FIG. 24.

FIGS. 24 and 25 illustrate a modified mounting of the brackets 278 of the linear guides 5, which is equally applicable to the remaining brackets 276, 280 and linear guide 11 previously described with reference to FIGS. 1, 2, and 5. The alteration here consists merely of replacing each locating block 286 of the previous embodiment with a block 394 having protruding wings 396 formed with fingergrip recesses 398.

To replace the belts 6 and 12, the screws 162 of FIG. 1 and the front plates 94 are first removed; the illustrated hex-head screws may if desired by replaced by screws with enlarged heads to facilitate removal by hand. The guides 5 and 11 are disengaged merely by depressing the heads of the screws 284 of FIGS. 24 and 25 while holding the blocks 396, so as to move the brackets 276, 278 or 280 out of engagement with the chamfered surfaces 282 of the plates 94. The belt tension is then relieved by adjustment of the screws 132 and 144 (see FIG. 2), after which the belts can be easily removed and replaced. These operations, and a reassembly in the reverse order, can be carried out very quickly, so that the operation of the transport need not be long interrupted.

Figure 26:
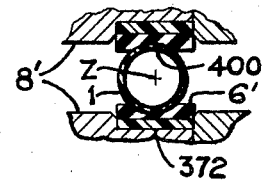
FIG. 26 is a fragmentary sectional plan view showing modified feed belts.

FIG. 26 shows a modification 6' of the feed belts which could make it possible to eliminate the linear guides 5 or 11 of preceding embodiments. The belts have concave grooves 400 about their outer peripheries, shaped to conform to the parts 1 and thereby fully constrain them in directions normal to the feed axis Z. The modified belts are illustrated on pulleys 8' like those of FIGS. 22 and 23. The belts may have various other cross-sectional forms tailored to suit any given part form.

What I claim is:

1. A transport mechanism for serially feeding parts of a selected generally cylindrical or prismatic form and selected nominal dimensions, said transport mechanism comprising, in combination:

first transport means defining a feed axis and comprising at least one pair of first feed elements opposed to one another on opposite sides of said feed axis and aligned parallel to a second axis perpendicular to said feed axis, said first feed elements being constructed and arranged to engage the peripheral surfaces of the parts, at at least two locations spaced apart along said feed axis, at points circumferentially spaced about said feed axis to locate the longitudinal axes of the parts in substantial coincidence with said feed axis at said locations;

second transport means aligned with and spaced apart from said first transport means along said feed axis to define a work station between said first and second transport means, said second transport means comprising at least one pair of second feed elements opposed to one another on opposite sides of said feed axis and aligned parallel to a second axis perpendicular to said feed axis, said second feed elements being constructed and arranged to receive parts fed from said first transport means and to engage the peripheral surfaces of said parts at points circumferentially spaced about said feed axis to locate the longitudinal axes of the received parts in substantial coincidence with said feed axis at a further location;

first and second support means each supporting a different one of said pair of first feed elements and a different one of said pair of second feed elements;

means mounting said support means for movement along said second axis;

adjusting means drivingly connected with said first and second support means and constructed and arranged for selectively displacing said first and second support means in opposite directions and equal distances along said second axis, to adjust the spacing between said feed elements to accommodate parts of various transverse dimensions;

and drive means drivingly connected with said first and second feed elements to advance the parts through said work station in translatory motion along said feed axis;

said transport means being constructed and arranged to feed parts substantially conforming to said selected form through said work station coaxially with said feed axis, and to feed parts deviating substantially from said selected form through said work station in relationships to said feed axis determined by the nature of the individual deviations of the parts.

2. A mechanism as recited in claim 1, said first and second transport means respectively including first and second pairs of stationary guide means each having a surface extending rectilinearly and substantially parallel to said feed axis for slidably engaging the peripheral surfaces of the parts lengthwise, said guide means of each pair being circumferentially spaced apart about said feed axis from one another and from said feed elements, and being opposed to one another on opposite sides of said feed axis and aligned on a third axis mutually perpendicular to said feed axis and said second axis;

said first and second support means being mutually drivingly engaged with said first and second guide means, and being constructed and arranged for displacing said guide means in opposite directions and equal distances along said third axis upon selective displacement of said support means along said second axis.

3. A mechanism as recited in claim 2, said mutual driving engagement between said support means and said guide means comprising mutually-engaging surfaces formed thereon and extending in planes parallel to said feed axis and oblique to said second and third axes.

4. A mechanism as recited in claim 3, said mutually-engaging surfaces extending in planes intersecting said second and third axes at 45 degree angles to effect equal displacements of said feed elements and guide means.

5. A mechanism as recited in claim 1, said drive means being drivingly connected with said feed elements by flexible means constructed and arranged to maintain a constant speed ratio in all positions of said support means.

6. A mechanism as recited in claim 1, said first transport means including a further pair of said first feed elements, the feed elements of said further pair being constructed and arranged to engage the peripheral surfaces of the parts, at points circumferentially spaced about said feed axis, at a further location spaced along said feed axis from said first feed elements in a direction opposite to the direction of part feed by said first feed elements;

said drive means being drivingly connected to actuate said further pair of feed elements to advance the parts toward said first feed elements at a slower rate than they are advanced by said first feed elements, thereby to separate the parts along said feed axis;

said first and second support means each supporting a different one of said further pair of first feed elements for adjustment of the spacing therebetween jointly with said first-mentioned pairs of first and second feed elements.

7. A transport mechanism for serially feeding discrete parts of a selected cylindrical or prismatic form and selected length, said transport mechanism comprising, in combination:

transport means defining a feed axis and comprising a succession of at least three feed means constructed and arranged to engage the peripheral surfaces of the parts at at least three locations spaced apart along said feed axis at intervals less than the selected length of the parts, and to locate the longitudinal axes of the parts in substantial coincidence with the feed axis, a work station being defined along said feed axis intermediate a second and third of said feed means;

and drive means connected for actuating said feed means to advance the parts along said feed axis in translatory non-rotating motion through said work station, said drive means being constructed and arranged to drive a second and third of said succession of feed means at equal feed rates to feed the parts uniformly through said work station, and to drive a first in said succession of feed means at a lower rate than said second and third feed means to separate the parts as they pass from said first to said second feed means;

said first feed means comprising a pair of rolls opposed to one another on opposite sides of said feed axis and rotatable on parallel axes lying in a plane normal to said feed axis, said second and third feed means comprising endless belts arranged in pairs having spans extending substantially parallel to said feed axis and opposed to one another an opposite sides thereof.

8. A transport mechanism for serially feeding parts of a selected generally cylindrical or prismatic form, said transport mechanism comprising, in combination:

transport means defining a feed axis and comprising a plurality of pairs of feed elements constructed and arranged to engage the peripheral surfaces of the parts at at least two locations spaced apart along said feed axis, the feed elements of each of said pairs being opposed to one another on opposite sides of said feed axis and aligned parallel to a second axis perpendicular to said feed axis;

drive means drivingly connected with said pairs of feed elements to advance the parts in translatory motion along said feed axis;

first and second support means each supporting a different one of each of said pairs of feed elements;

means mounting said support means for movement along said second axis;

and adjusting means drivingly connected with said first and second support means and constructed and arranged for selectively displacing said first and second support means in opposite directions and equal distances along said second axis, to simultaneously adjust the spacing between each pair of said feed elements to accommodate parts of various transverse dimensions.

9. A mechanism as recited in claim 8, said transport means including at least one pair of stationary guide means each having a surface extending rectilinearly and substantially parallel to said feed axis for slidably engaging the peripheral surfaces of the parts lengthwise, said guide means being opposed to one another on opposite sides of said feed axis and aligned on a third axis mutually perpendicular to said feed axis and said second axis;

said first and second support means being mutually drivingly engaged with said guide means, and being constructed and arranged for displacing said guide means in opposite directions and equal distances along said third axis upon selective displacement of said support means along said second axis.

10. A mechanism as recited in claim 9, said mutual driving engagement between said support means and said guide means comprising mutually-engaging surfaces formed thereon and extending in planes parallel to said feed axis and oblique to said second and third axes.

11. A mechanism as recited in claim 10, said mutually-engaging surfaces extending in planes intersecting said second and third axes at angles selected to maintain a uniform ratio between displacements of said feed elements and guide means.

12. A mechanism as recited in claim 8, said drive means being drivingly connected with said feed elements by flexible means constructed and arranged to maintain a constant speed ratio in all positions of said support means.

13. A transport mechanism for serially feeding parts of a selected generally cylindrical or prismatic form and selected nominal dimensions, said transport mechanism comprising, in combination:

first transport means defining a feed axis and including first feed elements constructed and arranged to engage the peripheral surfaces of the parts, at at least two locations spaced apart along said feed axis, at points circumferentially spaced about said feed axis to locate the longitudinal axes of the parts in substantial coincidence with said feed axis at said locations;

said first transport means including at least one further feed element comprising a pair of rolls opposed to one another on opposite sides of said feed axis and rotatable on parallel axes lying in a plane normal to said feed axis; said further feed element being constructed and arranged to engage the parts at a further location spaced along said feed axis from said first feed elements in a direction opposite to the direction of part feed by said first feed elements;

second transport means aligned with and spaced apart from said first transport means along said feed axis to define a work station between said first and second transport means, said second transport means comprising second feed elements constructed and arranged to receive parts fed from said first transport means and to engage the peripheral surfaces of said parts at points circumferentially spaced about said feed axis to locate the longitudinal axes of the received parts in substantial coincidence with said feed axis at a further location;

and drive means drivingly connected with said first and second feed elements to advance the parts through said work station in translatory motion along said feed axis;

said drive means being drivingly connected to actuate said further feed element to advance the parts toward said first feed elements at a slower rate than they are advanced by said first feed elements, thereby to separate the parts along said feed axis;

said transport means being constructed and arranged to feed parts substantially conforming to said selected form through said work station coaxially with said feed axis, and to feed parts deviating substantially from said selected form through said work station in relationships to said feed axis determined by the nature of the individual deviations of the parts.

* * * * *